United States Patent [19]

Sydansk et al.

[11] Patent Number: 5,358,046
[45] Date of Patent: Oct. 25, 1994

[54] OIL RECOVERY PROCESS UTILIZING A SUPERCRITICAL CARBON DIOXIDE EMULSION

[75] Inventors: Robert D. Sydansk; Karl D. Dreher, both of Littleton, Colo.

[73] Assignee: Marathon Oil Company, Findlay, Ohio

[21] Appl. No.: 145,370

[22] Filed: Oct. 29, 1993

Related U.S. Application Data

[63] Continuation-in-part of Ser. No. 22,703, Mar. 1, 1993, which is a continuation-in-part of Ser. No. 1,484, Jan. 7, 1993, Pat. No. 5,307,878.

[51] Int. Cl.$^5$ ............................................. E21B 43/22
[52] U.S. Cl. ................................... 166/275; 166/274
[58] Field of Search ............. 166/275, 274, 273, 305.1, 166/279; 252/8.554

[56] References Cited

U.S. PATENT DOCUMENTS

| | | | |
|---|---|---|---|
| Re. 32,302 | 12/1986 | Almond et al. | 166/308 |
| 3,741,307 | 6/1973 | Sandiford | 166/273 |
| 4,059,154 | 11/1977 | Braden, Jr. et al. | 166/274 |
| 4,480,696 | 11/1984 | Almond et al. | 166/308 |
| 4,519,455 | 5/1985 | Holtmyer et al. | 166/308 X |
| 4,554,082 | 11/1985 | Holtmyer et al. | 252/8.551 |
| 4,609,043 | 9/1986 | Cullick | 166/268 |
| 4,627,495 | 12/1986 | Harris et al. | 166/280 |
| 4,673,038 | 6/1987 | Sandiford et al. | 166/270 |
| 4,676,316 | 6/1987 | Mitchell | 166/274 |
| 4,694,906 | 9/1987 | Hutchins et al. | 166/294 |
| 4,856,589 | 8/1989 | Kuhlman et al. | 166/273 |
| 4,964,467 | 10/1990 | Holtmyer et al. | 166/308 |
| 4,971,150 | 11/1990 | Sanchez | 166/245 |
| 5,002,125 | 3/1991 | Phillips et al. | 166/271 |
| 5,033,547 | 7/1991 | Schievelbein | 166/274 |
| 5,069,283 | 12/1991 | Mack | 166/308 |
| 5,129,457 | 7/1992 | Sydansk | 166/274 |

OTHER PUBLICATIONS

Borchardt, et al., "Surfactants for CO Foam Flooding," SPE 14394, Sep. 22, 1985.
Wellington, et al., "CT Studies of Surfactant Induced CO Mobility Control," SPE 14393, Sep. 22, 1985.

*Primary Examiner*—Stephen J. Novosad

[57] ABSTRACT

A process utilizing an emulsion of a carbon dioxide phase and an aqueous phase is provided to enhance oil recovery from a subterranean formation. The aqueous phase is in a liquid state and is made up of a water-soluble polymer and surfactant dissolved within an aqueous solvent. The emulsion is prepared by condensing the carbon dioxide to a supercritical state under elevated pressure either at the surface or in situ. The carbon dioxide phase is mixed with the aqueous phase either prior to, simultaneously with, or subsequent to the condensation step. Placement of the emulsion in the formation via an injection well enables recovery of oil from the formation via a production well in accordance with one of several embodiments. In one embodiment, the emulsion functions as an oil displacement fluid. In other embodiments, the emulsion functions as a mobility control fluid or a conformance improvement treatment composition in conjunction with an oil displacement flood.

35 Claims, No Drawings

OIL RECOVERY PROCESS UTILIZING A SUPERCRITICAL CARBON DIOXIDE EMULSION

This is a continuation-in-part patent application of a prior copending patent application, U.S. Ser. No. 08/022,703, filed on Mar. 1, 1993, entitled "Polymer Enhanced Foams For Treating Gas Override Or Gas Channeling", which is a continuation-in-part application of U.S. Ser. No. 08/001,484, filed on Jan. 7, 1993, now U.S. Pat. No. 5,307,878.

BACKGROUND OF THE INVENTION

1. Technical Field

The present invention relates to a process for recovering liquid hydrocarbons from a subterranean hydrocarbon-bearing formation, and more particularly to such a process wherein an emulsion having a supercritical carbon dioxide phase and a liquid aqueous phase is placed in the formation to enhance liquid hydrocarbon recovery therefrom.

2. Description of Related Art

Carbon dioxide is a particularly attractive oil displacement fluid because of its relatively plentiful low-cost availability and because of its relatively high degree of solubility in oil, either at elevated pressures by means of a first contact mechanism, or at lower pressures by means of a multiple contact mechanism. Nevertheless, the effectiveness of carbon dioxide flooding is often offset by the high mobility of carbon dioxide due to its low viscosity, whether in a low-pressure gaseous state or in a high-pressure supercritical state.

One promising method for increasing the viscosity of carbon dioxide floods, thereby decreasing the mobility of the flood, is described in Wellington et al., "CT Studies of Surfactant-induced $CO_2$ Mobility Control", SPE Paper No. 14393. Sep. 1985. As taught therein, a carbon dioxide gas is dispersed in a brine by means of an aqueous surfactant producing a foam having a relatively high viscosity and a correspondingly reduced mobility. According to Wellington et al., carbon dioxide foam flooding is often a more effective alternative to carbon dioxide gas flooding for the displacement of oil from a subterranean formation.

The effectiveness of carbon dioxide foam flooding is further enhanced by the incorporation of viscosifiers into the foam, such as water-soluble polymers disclosed in U.S. Pat. No. 5,129,457 to Sydansk. The resulting polymer enhanced foams have been shown to outperform their polymer-free counterparts in low-pressure oil recovery applications within fractured formations, apparently due to the increased viscosity and stability of the polymer enhanced foam.

Another approach to improving the effectiveness, and in particular to decreasing the mobility of gas floods, is to place a more viscous polymer/surfactant solution in a homogeneous formation ahead of a miscible gas flood as taught by U.S. Pat. No. 4,676,316 to Mitchell. The polymer/surfactant solution effects simultaneous mobility and profile control of the subsequent miscible gas flood as evidenced by delayed gas breakthrough. Consequently, the process of Mitchell increases sweep efficiency, maintains gas flow frontal stability and avoids bypassing of oil caused by formation permeability stratification.

Yet another approach to improving the effectiveness of gas floods is taught by U.S. Pat. No. 4,609,043 to Cullick. A carbon dioxide gas flood is viscosified by condensing the gaseous carbon dioxide under supercritical conditions and dissolving a water insoluble polymer directly in the supercritical carbon dioxide with the use of a polar organic solubility agent, such as a monohydric lower alcohol or a glycol. Carbon dioxide in a supercritical state has been shown to be a particularly effective oil displacement fluid relative to carbon dioxide in the gaseous state.

A process whereby a viscosifier is dissolved or otherwise dispersed within the supercritical carbon dioxide without the use of a solubility agent, however, would be a preferred alternative to the process of Cullick from both an economic and operational standpoint. Yet, as noted in the Wellington et al. reference, carbon dioxide viscosifiers have been studied for years without success due to their low solubility in carbon dioxide.

Accordingly, it is an object of the present invention to provide a liquid hydrocarbon recovery process utilizing a displacement fluid having favorable stability, viscosity and mobility characteristics as well as favorable oil displacement characteristics. It is another object of the present invention to provide such a process whereby the bulk of the displacement fluid is made up of relatively inexpensive and plentiful components. It is yet another object of the present invention to provide a liquid hydrocarbon recovery process whereby the displacement fluid has a viscosifier phase readily dispersible within a carbon dioxide phase in the absence of a solubility agent.

It is an alternate object of the present invention to employ the above-described fluid as a mobility control fluid in conjunction with a liquid hydrocarbon displacement flood. It is another alternate object of the present invention to employ the above-described fluid as a permeability-reducing fluid or blocking agent in a conformance improvement treatment associated with a liquid hydrocarbon displacement flood.

SUMMARY OF THE INVENTION

The present invention is a process utilizing an emulsion to enhance the recovery of liquid hydrocarbons from a liquid hydrocarbon-bearing formation beneath the earthen surface. The process comprises placing an emulsion containing a carbon dioxide phase and an aqueous phase in the formation via an injection well bore in fluid communication with the formation. The carbon dioxide phase of the emulsion is in a supercritical state while the aqueous phase is in a liquid state. The aqueous phase is made up of a water-soluble polymer and a water-soluble surfactant in an aqueous solvent.

The emulsion is prepared by condensing carbon dioxide from a gas state to a supercritical state under elevated pressure either at the surface or in situ. The carbon dioxide phase is mixed with the aqueous phase either prior to, simultaneous with, or subsequent to condensation of the carbon dioxide phase. Placement of the emulsion in the formation enhances the recovery of liquid hydrocarbons therefrom via a production well bore in fluid communication with the formation.

In one embodiment, the emulsion functions as a displacement fluid that directly displaces liquid hydrocarbons from the formation. The displacement fluid has particular utility in a formation having a relatively high permeability region, such as a fractured region, because the emulsion has a sufficiently low mobility to effectively sweep liquid hydrocarbons from the high permeability region.

In another embodiment, the emulsion functions as a mobility control fluid for an oil displacement flood. The mobility control fluid has utility in either a heterogeneous or a relatively homogeneous formation to control and stabilize the flood front of a displacement fluid. In still another embodiment, the emulsion functions as a conformance improvement treatment composition in a high permeability region of a formation. The high permeability region can be a matrix region or an anomalous region, such as a fractured region of the formation, that is often in fluid communication with a liquid hydrocarbon-bearing low permeability region of the formation. The emulsion preferentially enters the region of high permeability and performs either as a permeability-reducing fluid or a blocking agent to divert an injected drive fluid into the liquid hydrocarbon-bearing region of low permeability.

The emulsion utilized herein exhibits more favorable stability, viscosity and mobility control characteristics than similar compositions having at least two phases wherein one phase is in a gas state and the other is in a liquid state, such as foams or discrete gas/liquid flooding sequences. As such, the present emulsion performs advantageously in an oil displacement, mobility control or conformance improvement treatment capacity as compared to the above-characterized gas/liquid compositions.

DESCRIPTION OF PREFERRED EMBODIMENTS

A number of specific terms are used throughout the specification to describe the process of the present invention and are defined as follows. A subterranean hydrocarbon-bearing formation is a geological structure which can comprise two general regions, a "matrix region" and an "anomalous region." An "anomalous region" is a region within the formation having a very high permeability relative to the remainder of the formation due to the presence of very high permeability anomalies. Such anomalies include fractures, fracture networks, joints, cracks, fissures, vugs, voids, solution channels, caverns, washouts, cavities, and the like.

Inclusive within the term "anomalous region" is a "fractured region" which is a region having a very high permeability attributable to the presence of fractures, joints, cracks, fissures, or networks thereof in the region. More specifically, the "fractured region" may be a "vertically fractured region" or a "horizontally fractured region." A "vertically fractured region" denotes a region containing fractures, joints, cracks, fissures, or networks thereof having a generally vertical orientation, i.e., having a deviation of at least 45° from the true horizontal. As a rule, vertically fractured regions are generally encountered at a subsurface depth greater than about 300 meters, while horizontally fractured regions are generally encountered above this depth. Since hydrocarbon-bearing formations are often below 300 meters, the fractured regions encountered therein are often vertically fractured regions.

The remaining regions of the formation are essentially "matrix regions", i.e., non-anomalous regions. "Matrix regions" are generally characterized as competent, being made up of substantially continuous, sedimentary geological material having a very low permeability relative to anomalous regions. Nevertheless, the matrix regions of a heterogeneous formation can exhibit regions or strata of differing permeability, the highest permeability matrix regions often being termed "high-permeability heterogeneities" or "high-permeability stringers."

The term "well bore" is defined herein as a bore hole extending from the earth surface to a subterranean hydrocarbon-bearing formation. Thus, a well bore is a conduit providing fluid communication between the surface and the formation penetrated thereby. A production well bore enables the removal of fluids from the formation to the surface and an injection well bore enables the placement of fluid into the formation from the surface. The term "well" is synonymous with the term "well bore."

A "foam" is a stabilized gas phase dispersed within a liquid phase, wherein the dispersed gas phase constitutes at least half of the total volume of the foam. The foam appears as a plurality of gas bubbles separated from one another by stabilized films of liquid. In porous media, such as the formation matrix, the foam may exist as discrete gas bubbles within the pore bodies of the porous medium. The bubbles are separated from one another by lamellae of interfacially stabilized liquid films.

Conventional oilfield foams consist of a foaming gas dispersed in a surfactant solution made up of a surfactant and a solvent. The surfactant acts as a foaming agent to facilitate and stabilize the gas dispersion within the liquid phase. A "polymer enhanced foam" is a specific type of oil field foam comprising a foaming gas dispersed in an aqueous surfactant solution, wherein the aqueous surfactant solution further includes a polymer dissolved therein.

In distinction to a foam, an "emulsion" has two discreet liquid phases of different composition, wherein one liquid phase is dispersed as droplets within the other liquid phase. The phases of the emulsion are typically highly immiscible in one another. For purposes of the present description, a carbon dioxide gas condensed to a supercritical state is deemed to constitute one liquid phase of an emulsion insofar as a mixture of a supercritical carbon dioxide phase and a liquid aqueous phase behaves as an emulsion of two liquid phases. Other terms used herein have definitions in accordance with the conventional usage of a skilled artisan, unless otherwise defined hereafter.

The process of the present invention is performed by preparing and placing an emulsion within a subterranean liquid hydrocarbon-bearing formation in the specific manner described hereafter. The emulsion is prepared from a carbon dioxide phase and an aqueous phase comprising a water-soluble polymer, a water-soluble surfactant and an aqueous solvent. The aqueous phase is preferably formulated by dissolving the polymer and surfactant in the aqueous solvent that is preferably free from any polymer crosslinking agent which could otherwise crosslink the polymer and convert the aqueous phase to a crosslinked polymer gel at some point in the process.

The polymer component of the aqueous phase is substantially any water-soluble, viscosity-enhancing polymer such as set forth in U.S. Pat. No. 5,129,457, incorporated herein by reference. The polymer is substantially inert with the other components of the emulsion. Either a biopolymer or a synthetic polymer has utility herein. Biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches, Synthetic polymers having utility herein include polyvinyl alcohol, polyethylene oxide, polyvinyl pyrrolidone, and acrylamide polymers. Exemplary acrylamide polymers are polyacrylamide, partially hydrolyzed polyacrylamide, acrylamide copolymers containing acrylamide and one other monomeric species (such as acrylate), and acrylamide terpolymers containing acrylamide and two other monomeric species, or acrylamide, acrylate, and one other monomeric species. Polyacrylamide (PA) is defined as an acrylamide homopolymer having substantially less than about 1% of its acrylamide groups converted to carboxylate groups. Partially hydrolyzed polyacrylamide (PHPA) is an acrylamide homopolymer having more than about 1%, but not 100%, of its acrylamide groups converted to carboxylate groups. Useful acrylamide polymers are prepared according to any conventional method, but preferably have the specific properties of an acrylamide polymer prepared according to the method disclosed in U.S. Pat. No. Re.32,114, incorporated herein by reference.

The average molecular weight of an acrylamide polymer having utility herein is generally in a range between about 10,000 and about 50,000,000, preferably between about 250,000 and about 20,000,000, and most preferably between about 1,000,000 and about 15,000,000. The polymer concentration in the aqueous phase is generally at least about 500 ppm, preferably at least about 2,000 ppm, and most preferably within a range between about 4,000 ppm and about 10,000 ppm.

The surfactant of the aqueous phase is substantially any water-soluble foaming agent suitable for oil field use that is compatible with the specific polymer selected, as will be evident to the skilled artisan. As such, the surfactant can be anionic, cationic or nonionic. A preferred surfactant is selected from the group consisting of ethoxylated alcohols, ethoxylated sulfates, refined sulfonates, petroleum sulfonates, and alpha olefin sulfonates including alpha olefin disulfonates and dimers. The concentration of surfactant in the aqueous phase is in a range between about 20 ppm and about 50,000 ppm, preferably between about 50 ppm and about 20,000 ppm, and most preferably at least about 1000 ppm. In general, the performance of the emulsion in the process of the present invention is relatively insensitive to the particular species and concentration of the surfactant selected, subject to the above-recited criteria, particularly when the selected polymer is an acrylamide polymer.

The aqueous solvent of the aqueous phase is substantially any aqueous liquid capable of forming a solution with the selected polymer and surfactant. The term "solution" as used herein with respect to the polymer and surfactant in the aqueous solvent is intended to broadly encompass true solutions, dispersions, emulsions, or any other homogeneous mixture of the polymer in the aqueous solvent. The solvent is preferably either a fresh water or a brine, such as a produced water from the subterranean formation. Produced water can be advantageous because of its low-cost availability and because it enables the practitioner to return the produced water to the formation, thereby eliminating disposal thereof.

The pH of the aqueous phase prior to contacting the carbon dioxide phase is generally within a range of about 4 to about 10, and preferably within a nearly neutral range of about 6 to about 8. In most cases, the pH of the aqueous phase inherently falls within the above-recited range without any pH adjustment thereof. However, should the pH of the aqueous phase be outside the desired range, the pH can be adjusted in accordance with conventional oil field procedures to achieve a desired pH range. The pH adjustment can be made in any manner known to the skilled artisan. Nevertheless, it has been found that the present process is relatively insensitive to the pH of the aqueous phase employed in the emulsion.

The carbon dioxide phase employed in the emulsion is made up at least in part of carbon dioxide, and is preferably made up substantially exclusively of carbon dioxide. Supercritical carbon dioxide is oftentimes miscible, or at least partially miscible in oil, and carbon dioxide gas in many cases is readily available in the field at low cost. The volume percentage of the carbon dioxide phase relative to the combined volume of the carbon dioxide and aqueous phases in the emulsion is typically within a range from about 50% to about 99%, more preferably within a range from about 60% to about 98%, and most preferably within a range from about 70% to about 97%.

Preparation of the emulsion is performed according to a number of different embodiments within the scope of the present invention. In all cases, however, preparation of the emulsion encompasses mixing the carbon dioxide and aqueous phases and condensing the carbon dioxide phase from an initial gaseous state to a supercritical state. The numerous embodiments of the present invention are differentiated from one another primarily by the specific sequence of the mixing and condensation steps in conjunction with placement of the emulsion in the formation. Placement encompasses injection of the carbon dioxide and aqueous phases from the surface into an injection well bore in fluid communication with the formation and displacement of the carbon dioxide and aqueous phases from the well bore into a desired region of the formation.

One embodiment of the invention is to maintain the carbon dioxide phase in a gaseous state while at the surface, performing the mixing and condensation steps in situ to obtain the emulsion. "At the surface" is defined herein as any location upstream of the injection well bore, including surface injection tubing. "In situ" is defined herein as any location downstream of the injection well bore, including the injection well bore itself and the subterranean formation. In variations of the present embodiment, the mixing step can be performed prior to, simultaneous with, or subsequent to the condensation step as long as both are performed in situ. Furthermore, the mixing or condensation steps can be performed in either the injection well bore or the formation.

Mixing of the carbon dioxide and aqueous phases can be effected in the well bore by coinjection of the two phases, while mixing of the two phases in the formation can be effected by sequential injection of two phases into the well bore. Because adequate mixing is difficult to achieve in formation anomalies, coinjection is often preferred over sequential injection, if the emulsion is being placed in an anomalous region. In contrast, mixing often occurs readily in matrix pores such that sequential injection can be used, if the emulsion is being placed in a matrix region.

Where mixing of the carbon dioxide and aqueous phases precedes condensation of the carbon dioxide phase, a foam intermediary can be formed prior to condensation, particularly if a downhole foam generator is positioned in the injection well bore during coinjection of the two phases via a common tubing string or separate tubing strings in the well bore. The resulting polymer enhanced foam is an emulsion precursor. As with coinjection, formation of the foam intermediary is generally preferred, if the emulsion is being placed in an anomalous region, while foam formation is generally unnecessary, if the emulsion is being placed in a matrix region.

A second embodiment of the invention comprises condensing the carbon dioxide phase at the surface and mixing the carbon dioxide and aqueous phases in situ to obtain the emulsion. As above, the in situ mixing step can be performed in the injection well bore or in the formation in conjunction with coinjection or sequential injection. Since condensation occurs before mixing, however, formation of the foam intermediary is not possible. Instead the emulsion is formed in situ immediately upon mixing of the two phases.

Another embodiment of the invention comprises mixing the carbon dioxide and aqueous phases at the surface and condensing the carbon dioxide phase in situ to obtain the emulsion. A foam intermediary is preferably preformed at the surface from the mixture of the two phases by means of any conventional artificial foam generator providing either high velocity flow or having a small flow orifice. In situ condensation of the carbon dioxide phase can be performed in the injection well bore or in the formation and the emulsion is formed in situ immediately upon condensation thereof.

Yet another embodiment of the present invention comprises mixing the carbon dioxide and aqueous phases and condensing the carbon dioxide phase at the surface to preform the emulsion at the surface prior to injection into the well bore. The mixing and condensation steps can be performed in either order, although condensation is preferred before mixing to avoid unnecessary formation of the foam intermediary.

Condensation of at least a portion of the carbon dioxide phase from a gaseous state to a supercritical state requires application of an elevated pressure to the carbon dioxide phase, preferably exceeding the supercritical pressure of carbon dioxide at the temperature thereof. The elevated pressure can be a process pressure applied to the carbon dioxide phase in the surface tubing, an injection pressure applied to the carbon dioxide phase in the injection well bore or formation, or the natural fluid pore pressure experienced by the carbon dioxide phase in the formation. Within a practical range of formation temperatures, the supercritical pressure typically ranges from about 6,900 to about 69,000 kPa.

A formation to which the present process is applicable has a plurality of essentially horizontally stratified regions including a region of high permeability and a region of low permeability, wherein one or both of the regions bear liquid hydrocarbons, and further wherein the two regions are in fluid communication with one another across the formation or the well bore. The region of low permeability is usually a matrix region and the region of high permeability is either a separate matrix region of greater permeability or an anomalous region. The formation is in fluid communication with the injection well bore and a liquid hydrocarbon production well bore by conventional means such as perforations placed in the well bore casing at the vertical position of the producing interval, In addition to heterogeneous formations, the present process is likewise applicable to homogeneous formations.

The emulsion is placed in the liquid hydrocarbon-bearing region of the heterogeneous or homogeneous formation to function as a liquid hydrocarbon displacement fluid. The emulsion displaces the liquid hydrocarbons from the hydrocarbon-bearing region, preferably by a miscible or partially miscible displacement mechanism, toward the liquid hydrocarbon production well bore where the displaced liquid hydrocarbons are produced to the surface. This embodiment has particular utility when high permeability anomalous regions, such as fractured regions, are present in the formation.

In another embodiment of the present invention, the emulsion is employed as a mobility control fluid for an oil displacement flood by injecting a volume of the emulsion into an injection well bore ahead of an often substantially larger volume of a drive fluid and displacing the emulsion toward a production well bore in a manner readily apparent to the skilled artisan. This embodiment is applicable to both heterogeneous and homogenous hydrocarbon-bearing formations, wherein the mobility control fluid stabilizes the flood front.

According to a further embodiment of the present invention, the emulsion is employed as a conformance improvement treatment composition by preferential placement of the emulsion via an injection or oil production well bore into a high permeability region of a formation that is in fluid communication with a hydrocarbon-bearing low permeability region of the formation across the formation or a well bore. The high permeability region is either an anomalous region, such as a fractured region, or a high permeability matrix region, while the low permeability region is preferably a matrix region.

A conventional drive fluid is injected into an injection well bore following the above-recited placement of the emulsion in an injection or production well bore. Exemplary conventional drive fluids applicable in the present process include inter alia carbon dioxide, steam, water, and aqueous polymer solutions. The emulsion reduces the permeability of the high permeability region, acting either as a permeability-reducing fluid of limited mobility or a substantially immobile blocking agent. The emulsion performs as an immobile blocking agent to the extent the pressure exerted on the emulsion by fluids flowing through the formation does not exceed the critical pressure gradient for flow of the emulsion. Thus, the emulsion diverts the drive fluid away from the high permeability region, and correspondingly diverts the drive fluid into the low permeability region. Consequently, the emulsion maximizes utilization of the drive fluid in the hydrocarbon-rich low permeability region, while minimizing loss of drive fluid to the substantially hydrocarbon-free high permeability region.

The emulsion is believed to be a non-Newtonian fluid, acting as a shear thinning fluid with a high apparent in situ viscosity on the order of about 0.5 to about 70,000 cp at 10 sec$^{-1}$ which enables effective performance as a conformance improvement composition, a mobility control fluid, or an oil displacement fluid.

The following examples demonstrate the practice and utility of the present invention, but are not to be construed as limiting the scope thereof.

EXAMPLE 1

A high permeability test sandpack 6.1 meters in length is housed in 0.64 cm OD (0.46 cm ID) monel tubing. The sand is 20–30 mesh Ottawa test sand. The sandpack has a permeability of 150 darcies, 38% porosity, and a pore volume of 35 cm$^2$. The sandpack is maintained at 22° C. and at a 10,400 kPa backpressure with a constant 690 kPa differential pressure being applied thereto, such that the inlet pressure is 11,090 kPa.

The sandpack is initially saturated with a synthetic reservoir brine having a total dissolved solids concentration of 5800 ppm. The principle constituents of the synthetic brine are: 500 ppm $Ca^{++}$, 160 ppm $Mg^{++}$, 1500 ppm $Na^+$, 200 ppm $K^+$, 2200 ppm $SO_4^{--}$, 1400 ppm $Cl^-$.

A fully formed emulsion is generated in a separate sandpack packed with 20–30 mesh Ottawa test sand and 0.3 meters in length by 1.1 cm in diameter. The emulsion has a supercritical carbon dioxide phase and a polymer-free aqueous phase, wherein the carbon dioxide phase makes up about 77 volume % of the emulsion. The aqueous phase contains a synthetic reservoir brine having the above-described composition and a $C_{14-16}$ alpha-olefin-sulfonate surfactant at a concentration of 2000 ppm.

A volume constituting 0.20 pore volumes (PV) of the polymer-free emulsion is injected into the test sandpack and displaced with the synthetic reservoir brine. The performance, propagation and stability of the emulsion bank is observed to be poor during the flood. None of the emulsion and little of the carbon dioxide is noted to be produced from the test sandpack, indicating that the polymer-free emulsion is not propagated through the sandpack. In addition, relatively little mobility reduction is noted in the sandpack.

EXAMPLE 2

The flooding experiment of Example 1 is repeated under the same conditions recited therein except the aqueous phase of the emulsion is augmented by the addition of partially hydrolyzed polyacrylamide (PHPA) at a concentration of 7000 ppm. The PHPA is 30% hydrolyzed and has a molecular weight of 11,000,000.

After injecting 0.20 PV of the polymer-augmented emulsion into the test sandpack, the overall effective mobility of the entire sandpack is reduced from 154,000 md/cp to 2,800 md/cp, i.e., 2% of the original mobility. The flood continues with injection of the synthetic brine. Emulsion breakthrough occurs after 1.0 PV of total injected fluids. The polymer-augmented emulsion is produced as a continuous bank of about 0.2 PV relatively fine textured fluid at the sandpack outlet. After the leading edge of the 0.20 PV emulsion bank is propagated substantially the entire length of the test sandpack, the measured overall average effective mobility of the entire sandpack is 12,000 md/cp, i.e., 8% of the original mobility. This level of mobility reduction within the entire sandpack provides sufficient mobility control for many oil recovery flooding operations.

EXAMPLE 3

The flooding experiment of Example 2 is repeated under the same conditions recited therein except the test sandpack is initially at irreducible water saturation with the synthetic reservoir brine and a 440 cp dead Wyoming crude oil. Emulsion breakthrough again occurs after about 1.0 PV of total injected fluids. The polymer-augmented emulsion is produced as a continuous bank of about 0.2 PV relatively fine textured fluid at the sandpack outlet. Crude oil is also produced primarily as a bank ahead of the emulsion. The 0.20 PV emulsion bank mobilizes and recovers about 94% of the crude oil saturation. Thus, the polymer-augmented emulsion is highly effective for mobilizing, banking, and recovering viscous crude oil.

While the foregoing preferred embodiments of the invention have been described and shown, it is understood that alternatives and modifications, such as those suggested and others, may be made thereto and fall within the scope of the present invention.

We claim:

1. A process for recovering liquid hydrocarbons from a liquid hydrocarbon-bearing formation beneath an earthen surface comprising:

placing an emulsion in a liquid hydrocarbon-bearing formation beneath an earthen surface to reduce the mobility of said formation, wherein said emulsion comprises a carbon dioxide phase in a supercritical state and an aqueous phase in a liquid state containing a water-soluble polymer and an aqueous solvent;

displacing liquid hydrocarbons from said formation into a liquid hydrocarbon production well bore; and recovering said liquid hydrocarbons at the surface via said hydrocarbon production well bore.

2. The process of claim 1 wherein said aqueous phase further contains a water-soluble surfactant.

3. The process of claim 2 wherein said surfactant is selected from the group consisting of ethoxylated alcohols, ethoxylated sulfates, refined sulfonates, petroleum sulfonates, and alpha olefin sulfonates including alpha olefin disulfonates and dimers.

4. The process of claim 1 wherein said polymer is an acrylamide polymer.

5. The process of claim 1 wherein said emulsion is placed in said formation by injecting said carbon dioxide phase in a gaseous state and said aqueous phase in said liquid state into said formation via an injection well bore in fluid communication with said formation, condensing said carbon dioxide phase to said supercritical state in situ, and mixing said carbon dioxide and aqueous phases in situ.

6. The process of claim 5 wherein said carbon dioxide phase and said aqueous phase are injected into said formation sequentially.

7. The process of claim 5 wherein said carbon dioxide phase and said aqueous phase are coinjected into said formation.

8. The process of claim 5 wherein said carbon dioxide phase is condensed prior to mixing said carbon dioxide and aqueous phases.

9. The process of claim 5 wherein said carbon dioxide phase is condensed in said injection well bore.

10. The process of claim 5 wherein said carbon dioxide phase is condensed in said formation.

11. The process of claim 5 wherein said carbon dioxide and aqueous phases are mixed forming a foam intermediary prior to condensing said carbon dioxide.

12. The process of claim 1 wherein said emulsion is placed in said formation by condensing said carbon dioxide phase from a gaseous state to a supercritical state, injecting said carbon dioxide phase in said supercritical state and said aqueous phase in said liquid state into said formation via an injection well bore in fluid communication with said formation, and mixing said carbon dioxide and aqueous phases in situ.

13. The process of claim 1 wherein said emulsion is placed in said formation by mixing said carbon dioxide phase in a gaseous state and said aqueous phase in a liquid state, injecting said carbon dioxide phase in said gaseous state and said aqueous phase in said liquid state into said formation via an injection well bore in fluid communication with said formation, and condensing said carbon dioxide phase from a gaseous state to a supercritical state in situ.

14. The process of claim 13 wherein said carbon dioxide and aqueous phases form a foam intermediary upon mixing.

15. The process of claim 1 wherein said emulsion is placed in said formation by condensing said carbon dioxide phase from a gaseous state to a supercritical state, mixing said carbon dioxide phase in a supercritical state and said aqueous phase in a liquid state to form said emulsion, and injecting said emulsion into said formation via an injection well bore in fluid communication with said formation.

16. The process of claim 1 further comprising injecting a drive fluid into said formation via said injection well bore to displace said emulsion into said liquid hydrocarbon production well bore.

17. The process of claim 1 wherein said formation is a substantially homogeneous formation.

18. The process of claim 1 wherein said formation is a substantially heterogeneous formation.

19. A process for recovering liquid hydrocarbons from a liquid hydrocarbon-bearing formation beneath an earthen surface comprising:
   placing an emulsion in a liquid hydrocarbon-bearing formation beneath an earthen surface, wherein said emulsion comprises a carbon dioxide phase in a supercritical state and an aqueous phase in a liquid state containing a water-soluble polymer and an aqueous solvent;
   displacing liquid hydrocarbons with said emulsion from said formation into a liquid hydrocarbon production well bore; and
   recovering said liquid hydrocarbons at the surface via said hydrocarbon production well bore.

20. The process of claim 19 wherein said aqueous phase further contains a water-soluble surfactant.

21. The process of claim 20 wherein said surfactant is selected from the group consisting of ethoxylated alcohols, ethoxylated sulfates, refined sulfonates, petroleum sulfonates, and alpha olefin sulfonates including alpha olefin disulfonates and dimers.

22. The process of claim 19 wherein said polymer is an acrylamide polymer.

23. The process of claim 19 wherein said emulsion is placed in said formation by injecting said carbon dioxide phase in a gaseous state and said aqueous phase in said liquid state into said formation via an injection well bore in fluid communication with said formation, condensing said carbon dioxide phase to said supercritical state in situ, and mixing said carbon dioxide and aqueous phases in situ.

24. The process of claim 19 wherein said emulsion is placed in said formation by condensing said carbon dioxide phase from a gaseous state to a supercritical state, injecting said carbon dioxide phase in said supercritical state and said aqueous phase in said liquid state into said formation via an injection well bore in fluid communication with said formation, and mixing said carbon dioxide and aqueous phases in situ.

25. The process of claim 19 wherein said emulsion is placed in said formation by mixing said carbon dioxide phase in a gaseous state and said aqueous phase in a liquid state, injecting said carbon dioxide phase in said gaseous state and said aqueous phase in said liquid state into said formation via an injection well bore in fluid communication with said formation, and condensing said carbon dioxide phase from a gaseous state to a supercritical state in situ.

26. The process of claim 19 wherein said emulsion is placed in said formation by condensing said carbon dioxide phase from a gaseous state to a supercritical state, mixing said carbon dioxide phase in a supercritical state and said aqueous phase in a liquid state to form said emulsion, and injecting said emulsion into said formation via an injection well bore in fluid communication with said formation.

27. A process for recovering liquid hydrocarbons from a liquid hydrocarbon-bearing formation beneath an earthen surface comprising:
   placing an emulsion in a high permeability region of a subterranean formation having a liquid hydrocarbon-bearing low permeability region of said formation to reduce the permeability of said high permeability region, wherein said emulsion comprises a carbon dioxide phase in a supercritical state and an aqueous phase in a liquid state containing a water-soluble polymer and an aqueous solvent;
   injecting a liquid hydrocarbon displacement fluid into said low permeability region via an injection well bore to displace liquid hydrocarbons from said low permeability region into a liquid hydrocarbon production well bore; and
   recovering said liquid hydrocarbons at the surface via said hydrocarbon production well bore.

28. The process of claim 27 wherein said aqueous phase further contains a water-soluble surfactant.

29. The process of claim 28 wherein said surfactant is selected from the group consisting of ethoxylated alcohols, ethoxylated sulfates, refined sulfonates, petroleum sulfonates, and alpha olefin sulfonates including alpha olefin disulfonates and dimers.

30. The process of claim 27 wherein said polymer is an acrylamide polymer.

31. The process of claim 27 wherein said low permeability region is a matrix region.

32. The process of claim 27 wherein said high permeability region is an anomalous region.

33. The process of claim 27 wherein said high permeability region is a matrix region.

34. The process of claim 27 wherein said high permeability region is in fluid communication with said low permeability region across said well bore.

35. The process of claim 27 wherein said high permeability region is in fluid communication with said low permeability region across said formation.

* * * * *